US012671141B2

(12) United States Patent
Kim et al.

(10) Patent No.: US 12,671,141 B2
(45) Date of Patent: Jun. 30, 2026

(54) BATTERY MODULE AND BATTERY PACK INCLUDING THE SAME

(71) Applicant: LG ENERGY SOLUTION, LTD., Seoul (KR)

(72) Inventors: Dayoung Kim, Daejeon (KR); Junghoon Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 708 days.

(21) Appl. No.: 18/020,594

(22) PCT Filed: Jan. 13, 2022

(86) PCT No.: PCT/KR2022/000651
§ 371 (c)(1),
(2) Date: Feb. 9, 2023

(87) PCT Pub. No.: WO2022/158791
PCT Pub. Date: Jul. 28, 2022

(65) Prior Publication Data
US 2024/0039114 A1 Feb. 1, 2024

(30) Foreign Application Priority Data

Jan. 19, 2021 (KR) ........................ 10-2021-0007657

(51) Int. Cl.
*H01M 50/383* (2021.01)
*A62C 3/16* (2006.01)
(Continued)

(52) U.S. Cl.
CPC ............. *H01M 50/383* (2021.01); *A62C 3/16* (2013.01); *A62C 35/10* (2013.01);
(Continued)

(58) Field of Classification Search
CPC ............. H01M 50/383; H01M 50/211; H01M 50/367; H01M 10/613; A62C 35/10; A62C 3/16
See application file for complete search history.

(56) References Cited

U.S. PATENT DOCUMENTS

| | | | |
|---|---|---|---|
| 10,651,438 B2 | 5/2020 | Lee | |
| 2017/0170439 A1 | 6/2017 | Jarvis et al. | |

(Continued)

FOREIGN PATENT DOCUMENTS

| | | | | |
|---|---|---|---|---|
| CN | 205488293 U | | 8/2016 | |
| CN | 207587799 U | * | 7/2018 | ............ H01M 10/42 |

(Continued)

OTHER PUBLICATIONS

US 10,608,220 B2, 03/2020, Lee (withdrawn)
(Continued)

*Primary Examiner* — Karie O'Neill Apicella
(74) *Attorney, Agent, or Firm* — Birch, Stewart, Kolasch & Birch, LLP

(57) ABSTRACT

Discussed is battery module that may include a battery cell stack in which a plurality of battery cells are stacked, a module frame that houses the battery cell stack and including a module frame upper part, and a fire extinguishing member located between the module frame upper part and an upper part of the battery cell stack, wherein the module frame upper part includes a venting part located between a central part of the module frame upper part and a peripheral part of the module frame upper part, wherein the venting part penetrates the module frame upper part toward the battery cell stack.

20 Claims, 7 Drawing Sheets

(51) Int. Cl.

| | |
|---|---|
| *A62C 35/10* | (2006.01) |
| *H01M 10/613* | (2014.01) |
| *H01M 50/211* | (2021.01) |
| *H01M 50/367* | (2021.01) |

(52) U.S. Cl.

CPC ....... *H01M 10/613* (2015.04); *H01M 50/211* (2021.01); *H01M 50/367* (2021.01); *H01M 2200/10* (2013.01); *H01M 2200/20* (2013.01)

(56) References Cited

U.S. PATENT DOCUMENTS

| | | |
|---|---|---|
| 2018/0248160 A1 | 8/2018 | Lee |
| 2018/0287116 A1 | 10/2018 | Seo et al. |
| 2019/0334143 A1 | 10/2019 | Sugeno |
| 2021/0050573 A1 | 2/2021 | Lee |
| 2021/0075075 A1 | 3/2021 | Kim et al. |

FOREIGN PATENT DOCUMENTS

| | | | | | |
|---|---|---|---|---|---|
| CN | 209785997 | U | 12/2019 | | |
| CN | 111584792 | A | 8/2020 | | |
| CN | 211789199 | U | * 10/2020 | .......... | H01M 10/613 |
| CN | 212366060 | U | 1/2021 | | |
| EP | 3 800 727 | A1 | 4/2021 | | |
| JP | 6390062 | B2 | 9/2018 | | |
| KR | 10-2009-0000292 | A | 1/2009 | | |
| KR | 10-2010-0081942 | A | 7/2010 | | |
| KR | 10-2010012 | B1 | 8/2019 | | |
| KR | 10-2123684 | B1 | 6/2020 | | |
| KR | 10-2149439 | B1 | 8/2020 | | |
| KR | 10-2020-0107214 | A | 9/2020 | | |
| KR | 10-2154361 | B1 | 9/2020 | | |
| WO | WO 2017/059419 | A1 | 4/2017 | | |
| WO | WO2018/131221 | A1 | 7/2018 | | |

OTHER PUBLICATIONS

Extended European Search Report for European Application No. 22742767.1, dated Feb. 9, 2024.

International Search Report for PCT/KR2022/000651 (PCT/ISA/210) mailed on May 3, 2022.

\* cited by examiner

【FIG. 1】 [Conventional Art]
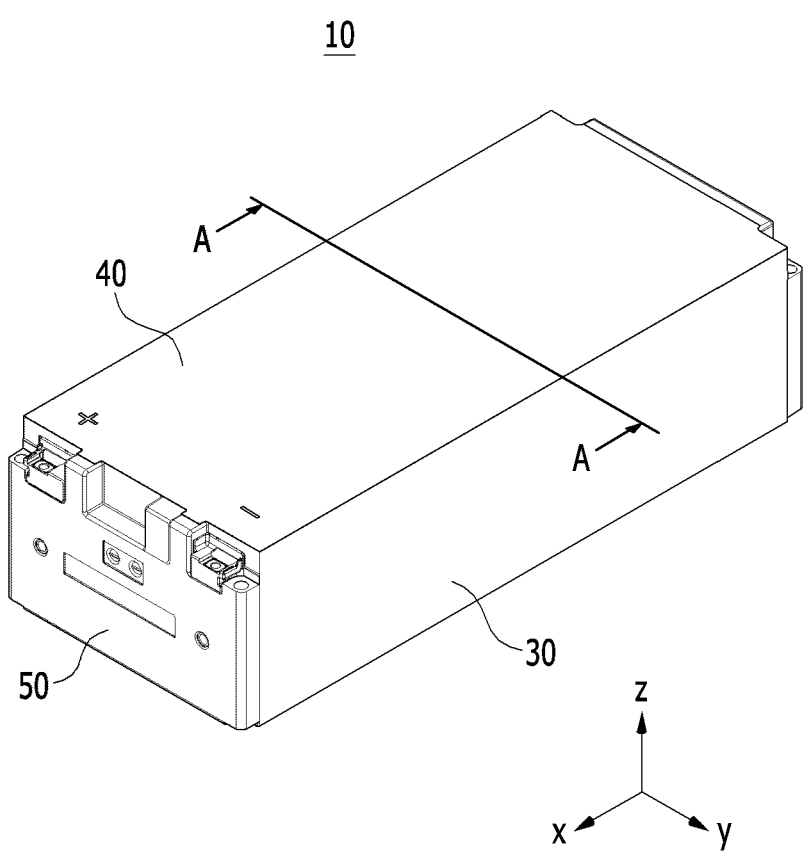

【FIG. 2】
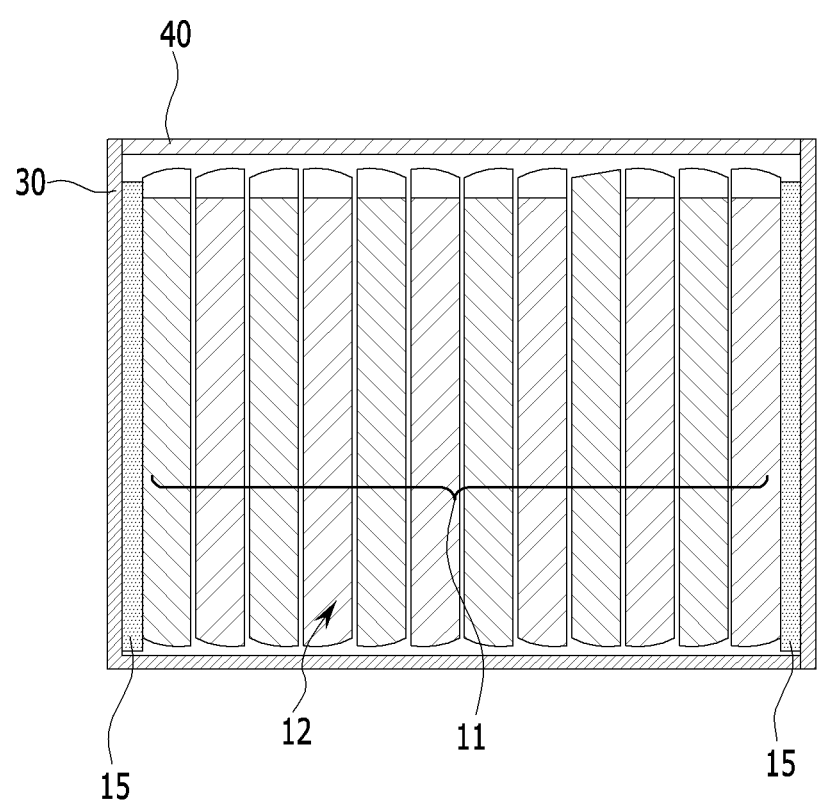

【FIG. 3】
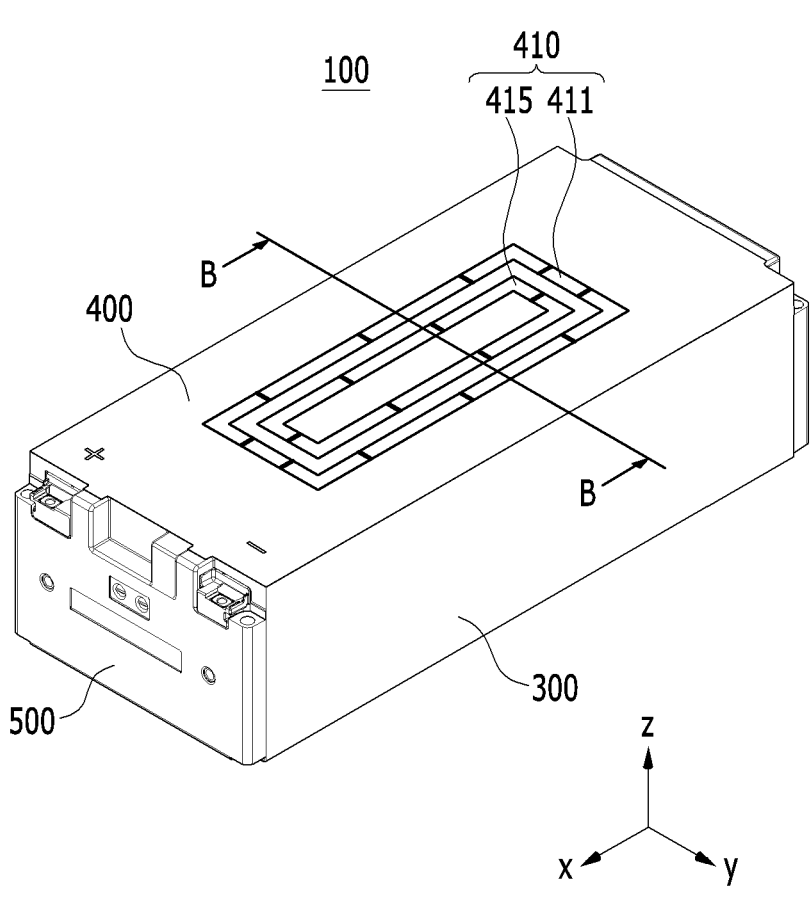

【FIG. 4】
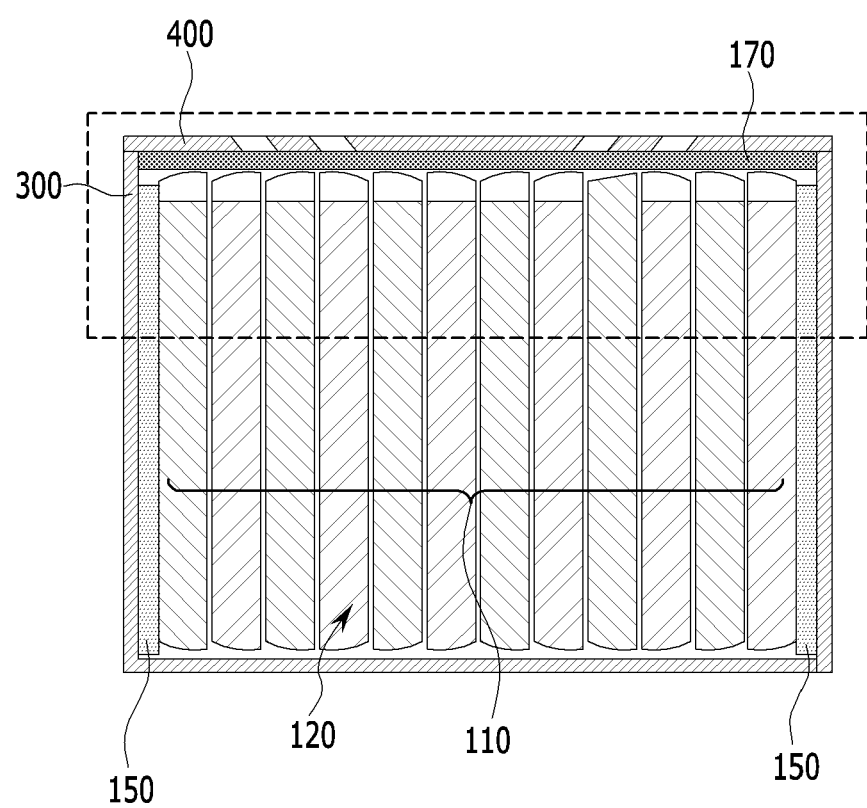
【FIG. 5】
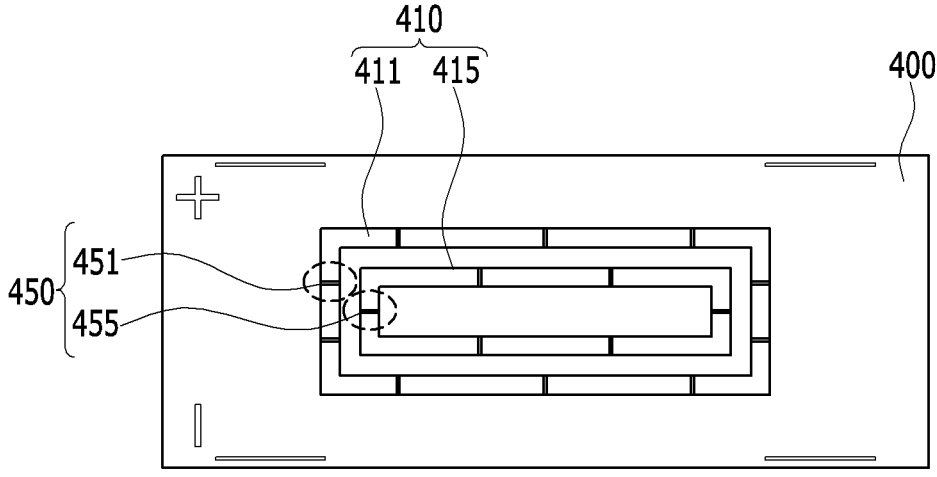

【FIG. 6】
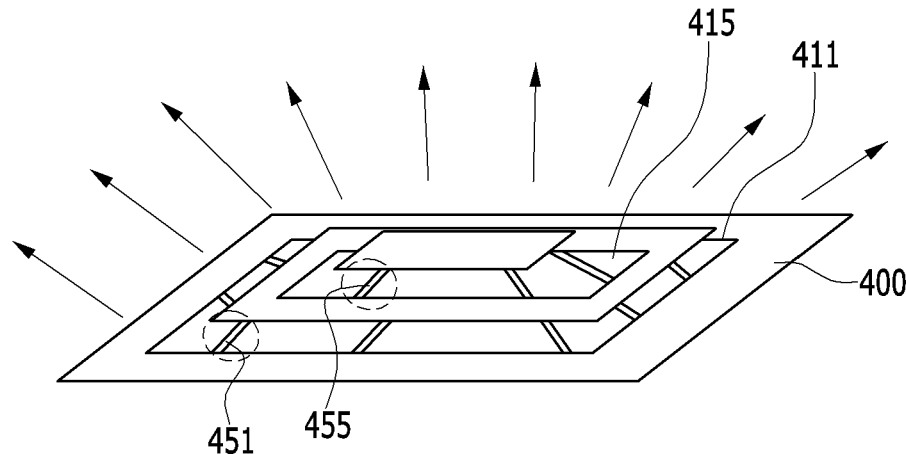
【FIG. 7】
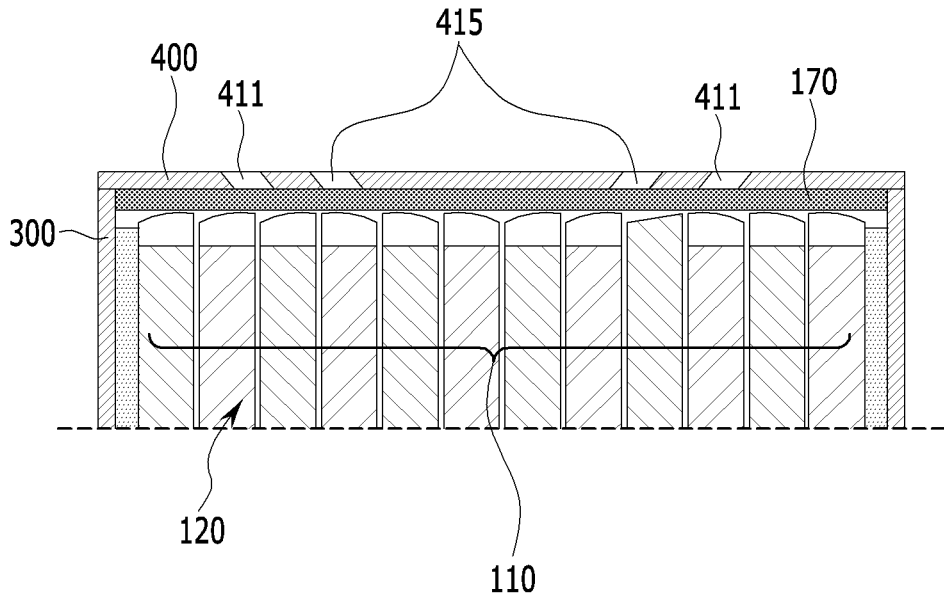

【FIG. 8】
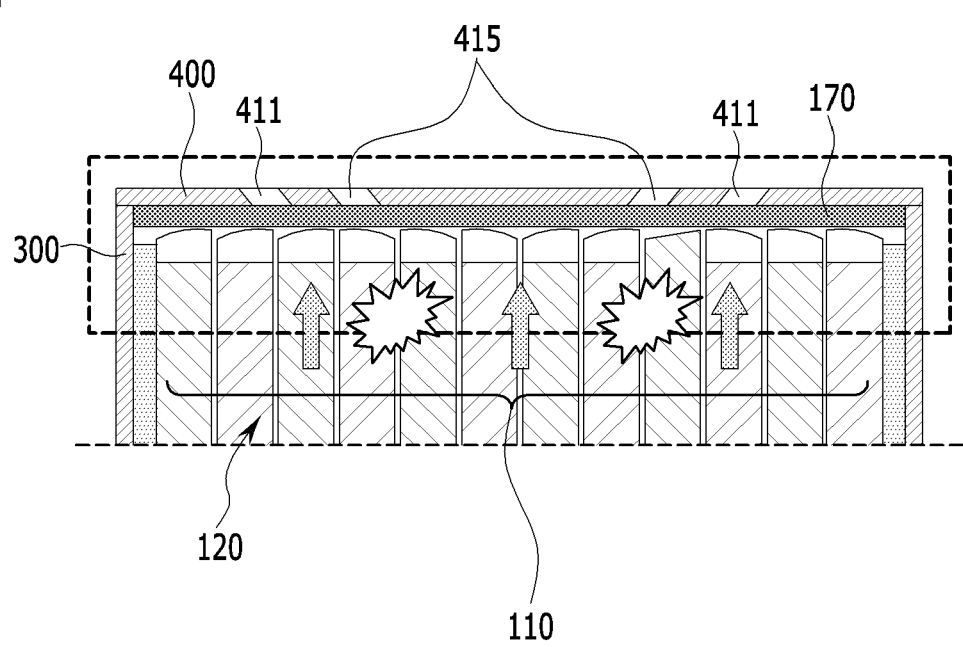

【FIG. 9】
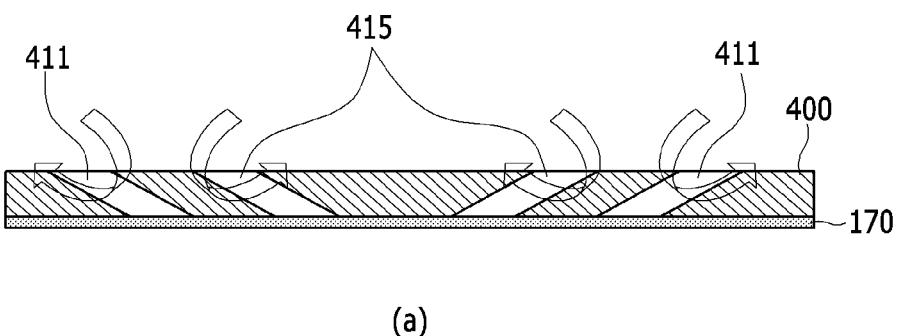
(a)
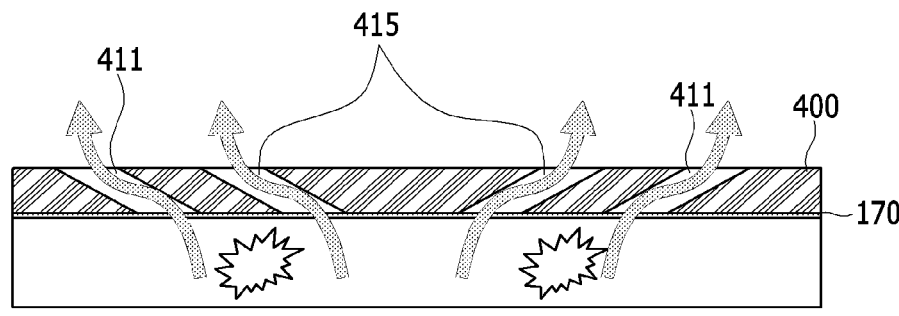
(b)

BATTERY MODULE AND BATTERY PACK INCLUDING THE SAME

TECHNICAL FIELD

Cross Citation with Related Application(s)

This application claims the benefit of and priority of Korean Patent Application No. 10-2021-0007657 filed on Jan. 19, 2021 with the Korean Intellectual Property Office, the content of which is incorporated herein by reference in its entirety.

The present disclosure relates to a battery module and a battery pack including the same, and more particularly, to a battery module that effectively suppresses flames and effectively discharges internal gases during ignition in the battery module, and a battery pack including the same.

BACKGROUND

Along with the increase of technology development and demands for mobile devices, the demand for batteries as energy sources is increasing rapidly. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

Small-sized mobile devices use one or several battery cells for each device, whereas middle or large-sized devices such as vehicles require high power and large capacity. Therefore, a middle or large-sized battery module having a plurality of battery cells electrically connected to one another is used.

The middle or large-sized battery module is preferably manufactured so as to have as small a size and weight as possible. Consequently, a prismatic battery, a pouch-shaped battery or the like, which can be stacked with high integration and has a small weight relative to capacity, is mainly used as a battery cell of the middle or large-sized battery module. Meanwhile, in order to protect the battery cell stack from external impact, heat or vibration, the battery module may include a module frame which is opened in its front and rear sides and houses the battery cell stack in an internal space.

FIG. 1 is a perspective view showing a conventional battery module. FIG. 2 is a cross-sectional view taken along the A-A axis of FIG. 1.

Referring to FIGS. 1 and 2, the conventional battery module 10 includes a battery cell stack 12 in which a plurality of battery cells 11 are stacked in one direction, module frames 30 and 40 that house the battery cell stack 12, end plates 50 that cover the front and rear surfaces of the battery cell stack 12, and a busbar frame (not shown) formed between the end plate 50 and the front and rear surfaces of the battery cell stack 12. Here, the module frames 30 and 40 include a lower frame 30 and an upper plate 40 of which the front and rear surfaces and the upper surface are opened. Here, a compression pad 15 may be included between the battery cell stack 12 and the module frames 30 and 40.

Here, the battery module 10 has a structure in which the inside of the battery module 10 is sealed by the module frames 30 and 40, so that when a part of the battery cells 11 included in the battery cell stack 12 ignites, flame and/or heat may be propagated to other adjacent battery cells 11. In addition, the pressure in the battery module 10 may be greatly increased due to ignition, and there is a problem that the ignition phenomenon is continuous, such as affecting adjacent battery modules 10.

Therefore, unlike the conventional case, there is a need to develop a battery module that effectively delays the heat propagation speed during ignition in the battery module 10 and has improved safety.

DETAILED DESCRIPTION OF THE INVENTION

Technical Problem

It is an object of the present disclosure to provide a battery module that effectively suppresses flames and effectively discharges internal gases during ignition in the battery module, and a battery pack including the same.

The objects of the present disclosure are not limited to the aforementioned objects, and other objects which are not described herein should be clearly understood by those skilled in the art from the following detailed description and the accompanying drawings.

Technical Solution

According to one aspect of the present disclosure, there is provided a battery module including: a battery cell stack in which a plurality of battery cells are stacked; a module frame that houses the battery cell stack and including a module frame upper part; and a fire extinguishing member located between the module frame upper part and an upper part of the battery cell stack, wherein the module frame upper part includes a venting part that is located between a central part of the module frame upper part and a peripheral part of the module frame upper part, and wherein the venting part penetrates the module frame upper part toward the battery cell stack.

The venting part may be formed in a frame-like structure that surrounds the central part of the module frame upper part.

The venting part may include at least one connection part that connects the central part of the module frame upper part and the peripheral part of the module frame upper part.

The at least one connection part may be formed at each corner of the venting part.

The venting part includes a first venting part and a second venting part, and the second venting part may be located in the central part of the module frame upper part surrounded by the first venting part, and may be located separately from the first venting part.

Each of the at least one connection part includes a first connection part and a second connection part, the first connection part may be formed at each corner of the first venting part, and the second connection part may be formed at each corner of the second venting part.

The venting part may penetrate the module frame upper part in a diagonal direction toward the battery cell stack.

The diagonal direction may have an angle toward the central part of the battery cell stack with respect to the module frame upper part.

One end of the venting part is exposed to an outside of the module frame, and another end of the venting part may be located adjacent to the fire extinguishing member.

The fire extinguishing member may extend along a stacking direction of the battery cell stack between the module frame upper part and the upper part of the battery cell stack.

The thickness of the fire extinguishing member may be equal to or smaller than the distance between the module frame upper part and the upper part of the battery cell stack.

The fire extinguishing member may include a fire extinguishing material containing a fire extinguishing agent.

According to one aspect of the present disclosure, there is provided a battery pack including the battery module.

Advantageous Effects

According to the embodiments, the present disclosure provides a battery module in which a fire extinguishing member is located on the upper part of the battery cell stack, and a venting part is formed on the module frame upper part, and a battery pack comprising the same, and can effectively suppress flames and effectively discharge internal gases during ignition in the battery module.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a perspective view showing a conventional battery module;

FIG. 2 is a cross-sectional view taken along the A-A axis of FIG. 1;

FIG. 3 is a perspective view of a battery module according to an embodiment of the present disclosure;

FIG. 4 is a cross-sectional view taken along the B-B axis of FIG. 3;

FIG. 5 is a top view of the battery module of FIG. 3;

FIG. 6 is a view showing a module frame upper part of the battery module of FIG. 3;

FIGS. 7 and 8 are enlarged views showing a part of FIG. 4; and

FIG. 9 is an enlarged view showing a part of FIG. 8.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

Further, throughout the description, when a portion is referred to as "including" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross portion cut vertically.

Hereinafter, a battery module according to an embodiment of the present disclosure will be described. However, the description will be given based on the front surface of the front and back surfaces of the battery module, but is not necessarily limited thereto. Even in the case of the rear side, it will be described in the same or similar manner.

FIG. 3 is a perspective view of a battery module according to an embodiment of the present disclosure. FIG. 4 is a cross-sectional view taken along the B-B axis of FIG. 3.

Referring to FIGS. 3 and 4, the battery module 100 according to an embodiment of the present disclosure includes a battery cell stack 120 in which a plurality of battery cells 110 are stacked; and module frames 300 and 400 that house the battery cell stack 120. Further, a busbar frame (not shown) may be located between the front and rear surfaces of the battery cell stack 120 and the end plate 500, and a busbar may be located on a busbar frame (not shown). Additionally, a compression pad 150 may be located between the side surface of the battery cell stack 120 and the module frames 300 and 400.

The module frames 300 and 400 include a module frame lower part 300 for housing the lower part and both side surfaces of the battery cell stack 120 and a module frame upper part 400 for covering the upper surface of the battery cell stack 120. However, the present invention is not limited thereto, and may be replaced with a frame having another shape, such as an L-shaped frame or a U-shaped frame and an upper plate.

The battery cell 110 is preferably a pouch-type battery cell. The battery cell can be manufactured by housing the electrode assembly in a pouch case of a laminate sheet including a resin layer and a metal layer, and then heat-sealing a sealing part of the pouch case. The battery cells 110 can be configured in plural numbers, and the plurality of battery cells 110 form a battery cell stack 120 that is stacked so as to be electrically connected to each other. In particular, as shown in FIGS. 3 and 4, a plurality of battery cells 110 can be stacked along a stacking direction parallel to the y-axis.

Further, referring to FIGS. 3 and 4, the battery module 100 according to the present embodiment includes a fire extinguishing member 170 located between the module frame upper part 400 and the upper part of the battery cell stack 120.

Further, the fire extinguishing member 170 may be attached to the lower surface of the module frame upper part 400. In one example, the fire extinguishing member 170 may be attached to the lower surface of the module frame upper part 400 through a separate adhesive layer. In another example, the fire extinguishing member 170 may have a sheet or foam shape, but may be attached to the lower surface of the module frame upper part 400 due to the adhesive force that the fire extinguishing member 170 itself has. In another example, the fire extinguishing member 170 is prepared in a liquid form, and may be applied or sprayed to a predetermined thickness on the lower surface of the module frame upper part 400. However, the present disclosure is not limited thereto, and the fire extinguishing member 170 may be attached to the lower surface of the module frame upper part 400 in various shapes.

Further, the fire extinguishing member 170 may extend along the stacking direction (y-axis direction) of the battery cell stack 120 between the module frame upper part 400 and the upper part of the battery cell stack 120. More specifically, the width of the fire extinguishing member 170 may extend along the stacking direction (y-axis direction) of the battery cell stack 120 between the module frame upper part 400 and the upper part of the battery cell stack 120. More preferably, the width of the fire extinguishing member 170 may extend equal to or less than the width of the upper part of the battery cell stack 120 between the module frame upper part 400 and the upper part of the battery cell stack body 120.

Further, the fire extinguishing member 170 may be located in a space spaced apart between the module frame upper part 400 and the battery cell stack 120. More specifically, the thickness of the fire extinguishing member 170 may be equal to or smaller than the distance spaced apart between the module frame upper part 400 and the upper part of the battery cell stack 120.

Thereby, in the battery module 100 according to the present embodiment, the fire extinguishing member 170 is disposed at a position corresponding to the upper part of the battery cell stack 120, whereby when a flame is generated in a part of the battery cells 110 of the battery cell stack 120, the intensity of the flame generated in the battery cells 110 can be effectively suppressed. In addition, the safety of the battery module 100 can also be improved.

Further, the fire extinguishing member 170 may be composed of a fire extinguishing material containing a fire extinguishing agent. Here, the fire extinguishing member 170 may be a member in the form of foam, an aerogel blanket, or a mica sheet. Additionally, the fire extinguishing agent material may be a commonly used powdered fire extinguishing agent material. In one example, the extinguishing agent material may be any one of sodium hydrogen carbonate ($NaHCO_3$), potassium hydrogen carbonate ($KHCO_3$), ammonium phosphate ($NH_4H_2PO_3$), and a mixture of "potassium hydrogen carbonate ($KHCO_3$) and urea ($(NH_2)_2CO$)". In particular, the extinguishing agent material contained in the fire extinguishing member 170 may include potassium hydrogen carbonate ($KHCO_3$). However, the fire extinguishing agent material is not limited thereto, and any material having a fire extinguishing function can be used without limitation.

Therefore, when an ignition phenomenon occurs in the battery module 100 according to the present embodiment, the fire extinguishing member 170 is located adjacent to the upper part of the battery cell stack 120, thereby being able to effectively suppress the intensity of the flame generated in the battery cell 110. In addition, carbon dioxide and water vapor can be generated in the process of extinguishing the flame generated in the battery cell 110 by the fire extinguishing member 170. This reaction is an endothermic reaction and can absorb heat from the battery cells 110, and can also cut off oxygen supply, thereby effectively delaying the flame and heat propagation speeds between the battery cells 110. Additionally, the safety of the battery module 100 can also be improved.

Next, the module frame upper part 400 and the venting part 410 will be described in more detail.

FIG. 5 is a top view of the battery module of FIG. 3. FIG. 6 is a view showing a module frame upper part of the battery module of FIG. 3.

Referring to FIGS. 4 to 6, in the present embodiment, the module frame upper part 400 includes a venting part 410 that is located between a central part of the module frame upper part 400 and a peripheral part of the module frame upper part, and penetrates toward the battery cell stack 120.

Further, in the module frame upper part 400, the venting part 410 may be formed in a frame-like structure surrounding the central part of the module frame upper part 400. In one example, the venting part 410 may be formed in a frame-like structure having four corners. Here, the four corners may be arranged and connected in a direction perpendicular to each other. However, the shape of the venting part 410 is not limited thereto, and may be formed in a structure having various shapes.

Thereby, when a part of the aforementioned fire extinguishing member 170 is melted during the occurrence of an ignition phenomenon in the battery module 100, gas in the internal battery module 100 may be discharged through the venting part 410.

Further, referring to FIGS. 5 and 6, the venting part 410 may include at least one connection part 450 that connects the central part of the module frame upper part 400 and the peripheral part of the module frame upper part 400. More specifically, at least one connection part 450 may be formed at each corner forming the venting part 410. In one example, when the venting part 410 has a frame-like structure composed of four corners, at least one connection part 450 may be formed in each of the four corners.

Here, the connection part 450 may be a material containing a flame retardant and/or a fire resistant material. More specifically, the connection part 450 may be an elastic material coated with a flame retardant and/or fire resistant material. However, the present disclosure is not limited thereto, and any material having sufficient flame retardancy and/or fire resistance to the extent of being not deformed by a flame or high-temperature gas generated during ignition of the battery module 100 can be applied.

Thereby, the connection part 450 is not deformed even when the battery module 100 ignites, and thus can be sufficiently supported between the central part of the module frame upper part 400 and the peripheral part of the module frame upper part 400, and high-temperature gas and/or flame may be sufficiently discharged to the outside through the venting part 410.

Further, in the present embodiment, the venting part 410 includes a first venting part 411 and a second venting part 415, and the second venting part 415 is located in the central part of the module frame upper part 400 surrounded by the first venting part 411, but may be spaced apart from the first venting part 411. Here, the connection part 450 includes a first connection part 451 and a second connection part 455, the first connecting part 451 is formed at each corner forming the first venting part 411, and the second connection part 455 may be formed at each corner forming the second vent part 415. However, according to another embodiment, in the venting part 410, one of the first venting part 411 and the second venting part 415 may be omitted or a separate venting part may be further disposed.

Thereby, even if the pressure in the battery module 100 is excessively increased due to the ignition phenomenon in the battery module 100, the central part of the module frame upper part 400 surrounded by the venting part 410 may expand in the vertical direction, wherein the connection part 450 can support the central part of the expanded module frame upper part 400. That is, the gas in the battery module 100 can be discharged to the outside through the space between the central part of the expanded module frame upper part 400 and the venting part 410. Further, as the connection part 450 prevents the central part of the module frame upper part 400 from being excessively expanded, it is possible to prevent the venting gas from being discharged too quickly through the venting unit 410. That is, the ignition time of the battery module 100 can be delayed, and the safety of the battery module 100 can be further improved.

FIGS. 7 and 8 are enlarged views showing a part of FIG. 4. FIG. 9(a) is an enlarged view showing the upper plate of FIG. 7, and FIG. 9(b) is an enlarged view showing a part of FIG. 8. FIGS. 7 to 9 are described with reference to the case where the venting part 410 includes the first venting part 411 and the second venting part with reference to FIG. 4. The first venting part 411 and the second venting part 415 in FIGS. 7 to 9 will be collectively referred to as a venting part 410.

Referring to FIGS. 7 and 8, one end of the venting part 410 may be exposed to the outside, and the other end of the venting part 410 may be located adjacent to the fire extinguishing member 170. More specifically, the other end of the venting part 410 may be in contact with one surface of the fire extinguishing member 170. In other words, the other end of the venting unit 140 may be sealed with the fire extinguishing member 170.

Thereby, referring to FIGS. 7 and 9 (*a*), during normal operation of the battery module 100, the venting part 410 is sealed, thereby being able to prevent external contaminants or external air from flowing into the battery module 100. Further, referring to FIGS. 8 and 9 (*b*), when the battery module 100 ignites, the fire extinguishing member 170 first comes into contact with the flame, thereby effectively suppressing the flame.

In addition, at least a part of the fire extinguishing member 170 is melted while the fire extinguishing member 170 extinguishes flames in the battery module 100, and a part of the venting part 410 being in contact with the fire extinguishing member 170 can be opened. Thereby, in a state in which most of flames in the battery module 100 is removed through the venting part 410, the gas remaining in the battery module 100 can be discharged to the outside.

Further, the venting part 410 may penetrate in a diagonal direction toward the battery cell stack 120. Here, the diagonal direction may have an angle toward the central part of the battery cell stack 120 with respect to the module frame upper part 400. In one example, when the venting part 410 has a frame-like structure having four corners, corners facing each other may be penetrated in a diagonal direction symmetrical to each other around the module frame upper part 400.

Therefore, in the battery module 100 according to the present embodiment, the venting part 410 is formed in a diagonal direction, thereby being able to indirectly cut off the inflow of external substances. In addition, the venting path is secured as long as possible during ignition in the battery module 100, thereby being able to delay the speed at which the flame and/or gas in the battery module 100 is discharged to the outside.

A battery pack according to another embodiment of the present disclosure includes the battery module described above. Meanwhile, one or more battery modules according to the present embodiment can be packaged in a pack case to form a battery pack.

The above-mentioned battery module and the battery pack including the same can be applied to various devices. Such a device may be applied to a vehicle means such as an electric bicycle, an electric vehicle, or a hybrid vehicle, but the present disclosure is not limited thereto, and is applicable to various devices that can use a battery module and a battery pack including the same, which also falls under the scope of the present disclosure.

Although the invention has been shown and described with reference to the preferred embodiments, the scope of the present disclosure is not limited thereto, and numerous changes and modifications can be devised by those skilled in the art using the principles of the invention defined in the appended claims, which also falls within the spirit and scope of the present disclosure.

DESCRIPTION OF REFERENCE NUMERALS

110: battery cell
120: battery cell stack
170: fire extinguishing member
300, 400: module frame
410: venting unit
450: connection part
500: end plate

The invention claimed is:

1. A battery module comprising:
a battery cell stack in which a plurality of battery cells are stacked;
a module frame that houses the battery cell stack and including a module frame upper part; and
a fire extinguishing member located between the module frame upper part and an upper part of the battery cell stack,
wherein the module frame upper part comprises a venting part located between a central part of the module frame upper part and a peripheral part of the module frame upper part, and
wherein the venting part penetrates the module frame upper part toward the battery cell stack, and
wherein the fire extinguishing member overlaps the venting part.

2. The battery module of claim 1, wherein:
the venting part is formed in a frame-like structure that surrounds the central part of the module frame upper part.

3. The battery module of claim 2, wherein:
the venting part comprises at least one connection part that connects the central part of the module frame upper part and the peripheral part of the module frame upper part.

4. The battery module of claim 3, wherein:
the at least one connection part is formed at each corner of the venting part.

5. The battery module of claim 3, wherein:
the venting part comprises a first venting part and a second venting part, and
the second venting part is located in the central part of the module frame upper part surrounded by the first venting part, and is located separately from the first venting part.

6. The battery module of claim 5, wherein:
each of the at least one connection part comprises a first connection part and a second connection part,
the first connection part is formed at each corner of the first venting part, and
the second connection part is formed at each corner of the second venting part.

7. The battery module of claim 2, wherein:
the venting part penetrates the module frame upper part in a diagonal direction toward the battery cell stack.

8. The battery module of claim 7, wherein:
the diagonal direction has an angle toward the central part of the battery cell stack with respect to the module frame upper part.

9. The battery module of claim 1, wherein:
one end of the venting part is exposed to an outside of the module frame, and another end of the venting part is located adjacent to the fire extinguishing member.

10. The battery module of claim 9, wherein:

the fire extinguishing member extends along a stacking direction of the battery cell stack between the module frame upper part and the upper part of the battery cell stack.

11. The battery module of claim 10, wherein:

a thickness of the fire extinguishing member is equal to or smaller than a distance between the module frame upper part and the upper part of the battery cell stack.

12. The battery module of claim 1, wherein:

the fire extinguishing member includes a fire extinguishing material containing a fire extinguishing agent.

13. A battery pack comprising the battery module of claim 1.

14. The battery module of claim 1, wherein the fire extinguishing agent includes one at least one of sodium hydrogen carbonate ($NaHCO_3$), potassium hydrogen carbonate ($KHCO_3$), ammonium phosphate ($NH_4H_2PO_3$), and a mixture of potassium hydrogen carbonate ($KHCO_3$) and urea (($NH_2$)$_2CO$).

15. The battery module of claim 1, wherein the fire extinguishing member is attached to a lower surface of the module frame upper part.

16. The battery module of claim 1, wherein the fire extinguishing member is in a form of one of a foam, an aerogel blanket, and a mica sheet.

17. The battery module of claim 1, wherein the fire extinguishing member is configured to be melted when an ignition phenomenon occurs in the battery module.

18. The battery module of claim 17, wherein when the fire extinguishing member is melted during the ignition phenomenon, the venting part is exposed to discharge gas through the venting part.

19. A battery module comprising:

a battery cell stack in which a plurality of battery cells are stacked;

a module frame that houses the battery cell stack and including a module frame upper part; and a fire extinguishing member located between the module frame upper part and an upper part of the battery cell stack, wherein the module frame upper part comprises a venting part located between a central part of the module frame upper part and a peripheral part of the module frame upper part, wherein the venting part penetrates the module frame upper part toward the battery cell stack, wherein the venting part comprises a first venting part, a second venting part, and a connection part connecting the central part and the peripheral part of the module frame upper part, and wherein:

the connection part comprises a first connection part and a second connection part, the first connection part is formed at each corner of the first venting part, and the second connection part is formed at each corner of the second venting part.

20. A battery module comprising:

a battery cell stack in which a plurality of battery cells are stacked;

a module frame that houses the battery cell stack and including a module frame upper part; and a fire extinguishing member located between the module frame upper part and an upper part of the battery cell stack, wherein the module frame upper part comprises a venting part located between a central part of the module frame upper part and a peripheral part of the module frame upper part, wherein the venting part penetrates the module frame upper part toward the battery cell stack, wherein:

the venting part is formed in a frame-like structure that surrounds the central part of the module frame upper part, the venting part comprises at least one connection part that connects the central part of the module frame upper part and the peripheral part of the module frame upper part, the venting part comprises a first venting part and a second venting part, the second venting part is located in the central part of the module frame upper part surrounded by the first venting part, and is located separately from the first venting part, each of the at least one connection part comprises a first connection part and a second connection part, the first connection part is formed at each corner of the first venting part, and the second connection part is formed at each corner of the second venting part.

\* \* \* \* \*